(12) United States Patent
Sanders

(10) Patent No.: US 11,255,591 B1
(45) Date of Patent: Feb. 22, 2022

(54) PORTABLE COOLING DEVICE

(71) Applicant: Brian Sanders, Lame Deer, MT (US)

(72) Inventor: Brian Sanders, Lame Deer, MT (US)

( * ) Notice: Subject to any disclaimer, the term of this patent is extended or adjusted under 35 U.S.C. 154(b) by 250 days.

(21) Appl. No.: 16/527,143

(22) Filed: Jul. 31, 2019

(51) Int. Cl.
  *F25D 3/00* (2006.01)
  *F25D 3/10* (2006.01)
  *F25D 17/06* (2006.01)

(52) U.S. Cl.
  CPC ............. *F25D 3/107* (2013.01); *F25D 3/105* (2013.01); *F25D 17/06* (2013.01)

(58) Field of Classification Search
  CPC ........... F25D 3/107; F25D 3/105; F25D 17/06
  See application file for complete search history.

(56) References Cited

U.S. PATENT DOCUMENTS

| 5,809,785 | A | 9/1998 | Polkinghome | |
|---|---|---|---|---|
| 6,929,061 | B2 | 8/2005 | Lajeunesse | |
| 2006/0279052 | A1* | 12/2006 | Marmah | A47C 1/14 280/47.26 |
| 2010/0218519 | A1* | 9/2010 | Hall | F25B 41/31 62/73 |
| 2010/0223934 | A1* | 9/2010 | McCormick | F25B 9/145 62/6 |
| 2017/0370629 | A1* | 12/2017 | Fire | B67D 1/0874 |
| 2018/0180353 | A1* | 6/2018 | Shuntich | F25D 3/08 |
| 2018/0266751 | A1* | 9/2018 | Lim | G06Q 10/0875 |
| 2020/0018536 | A1* | 1/2020 | Rosell | F25D 23/061 |

* cited by examiner

*Primary Examiner* — Elizabeth J Martin
*Assistant Examiner* — Nael N Babaa
(74) *Attorney, Agent, or Firm* — Sanchelima & Associates, P.A.; Christian Sanchelima; Jesus Sanchelima

(57) ABSTRACT

A system for a portable cooling device is disclosed herein. The portable cooling device comprises a housing and a door with a handle coupled to the housing for providing access to the interior of the housing. The door and housing are insulated. At least one fan is provided in the interior of housing. In an embodiment, a plurality of fans are configured on each surface defining the interior of the housing. A cooling medium source is in fluid communication with the housing. The cooling medium source is configured to release a cooling medium in the interior of the housing for cooling an edible item or beverage placed in the interior of the housing. The portable cooling device can be powered through solar means or through traditional electrical means. The power is necessary to operate the fans and the cooling medium source.

5 Claims, 4 Drawing Sheets

PORTABLE COOLING DEVICE

BACKGROUND OF THE INVENTION

1. Field of the Invention

The present disclosure relates to the field of refrigeration. In particular, the present disclosure relates to a portable cooling device for instantly cooling edible items or beverages.

2. Description of the Related Art

Cooling devices or refrigerators are known in the art. Conventionally, the refrigerators work on typical refrigeration cycles to provide cooling to the food items. However, most of these cycles fail to provide instant cooling, as may be required for some specific applications. Further, such conventional refrigerators are typically not portable owing to their bulky size or the requirement of constant power supply from a power port.

Several designs for refrigerators have been designed in the past. None of them, however, include a portable flash cooling device for quickly cooling food and beverages comprising a container having a hollow cubical interior with multiple fans arranged in a honeycomb arrangement on the interior surfaces of the hollow interior, where the device has a hinged closure and a carrying handle, and the device may be solar powered. Also, none are known to have a simple and portable configuration designed to provide instantaneous cooling to edible items or beverages and a power efficient working which does not require a power port for operation, which allows the cooling device to be used outdoors.

Applicant believes that a related reference corresponds to U.S. Pat. No. 6,929,061 filed by Marc Lajeunesse. The Lajeunesse reference discloses a self-contained, portable, computer operated, light weight, temperature-controlled compartment for installation in emergency vehicles has insulated walls and a door. The compartment carries a mechanical refrigeration system having a small compressor for cooling the interior and electrical heating units providing radiant heat to the interior. However, the compartment disclosed in the Lajeunesse reference is designed to be installed in a vehicle and cannot be used outdoors. Furthermore, the compartment disclosed in the Lajeunesse reference includes a mechanical refrigeration cycle, which generally does not provide instantaneous cooling.

Applicant believes that another related reference corresponds to U.S. Pat. No. 5,809,785 filed by John D. Polkinghorne. The Polkinghorne reference discloses a compact thermoelectric refrigeration drive assembly that comprises at least one thermoelectric heat transfer device (Peltier Effect device) whose active surfaces are in contact with a respective one of a collector member and a transfer member. However, the refrigeration drive assembly disclosed in the Polkinghorne reference fails to provide a configuration that provides instantaneous cooling of edible items or beverages and that can be used outdoors.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a portable cooling device have simple and portable configuration.

It is another object of the present invention to provide a portable cooling device designed to provide instantaneous cooling to edible items or beverages.

It is yet another object of the present invention to provide a portable cooling device having a power efficient working which does not require a power port for operation, thereby facilitating the use of the cooling device outdoors.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
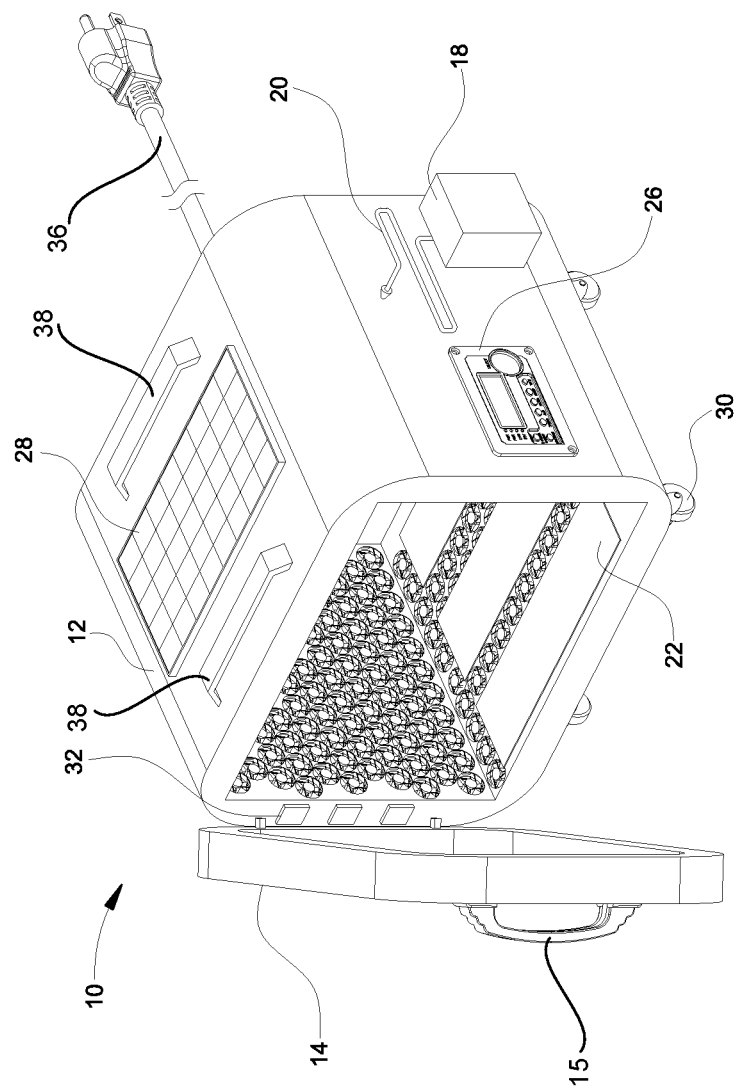
FIG. 1 illustrates an isometric view of a portable cooling device 10, in accordance with an embodiment of the present invention, wherein portable cooling device 10 comprises a housing 12, a door 14 coupled to housing 12 for providing access to the interior of housing 12, at least one fan 16 provided in the interior of housing 12, and a cooling medium source 18 in fluid communication with housing 12.
Figure 2:
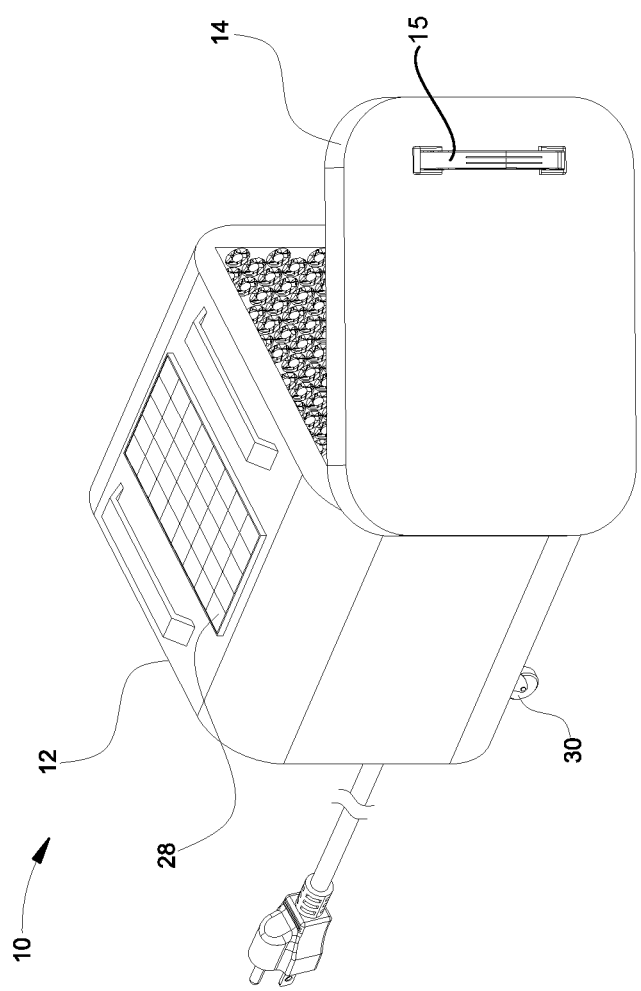
FIG. 2 illustrates another isometric view of portable cooling device 10, in accordance with an embodiment of the present invention.
Figure 3:
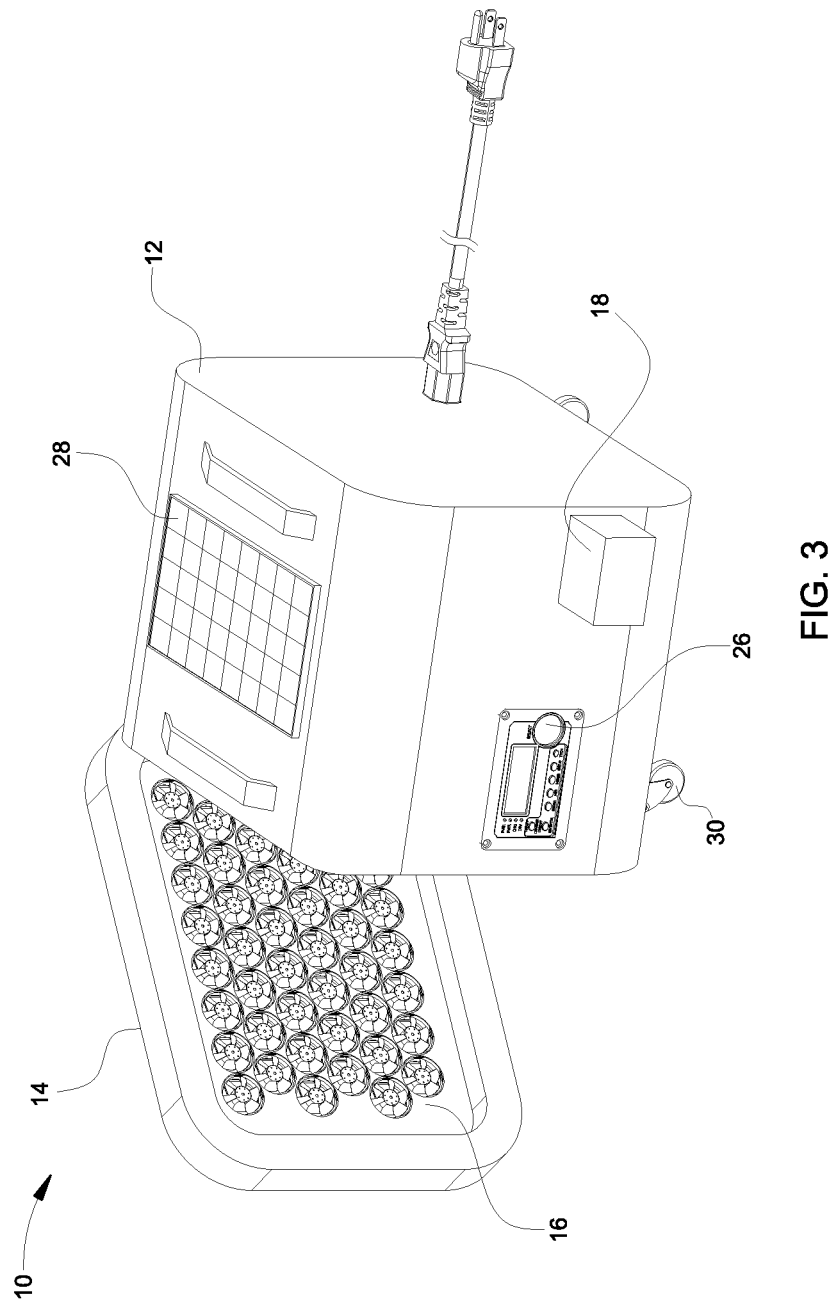
FIG. 3 illustrates yet another isometric view of portable cooling device 10, in accordance with an embodiment of the present invention.
Figure 4:
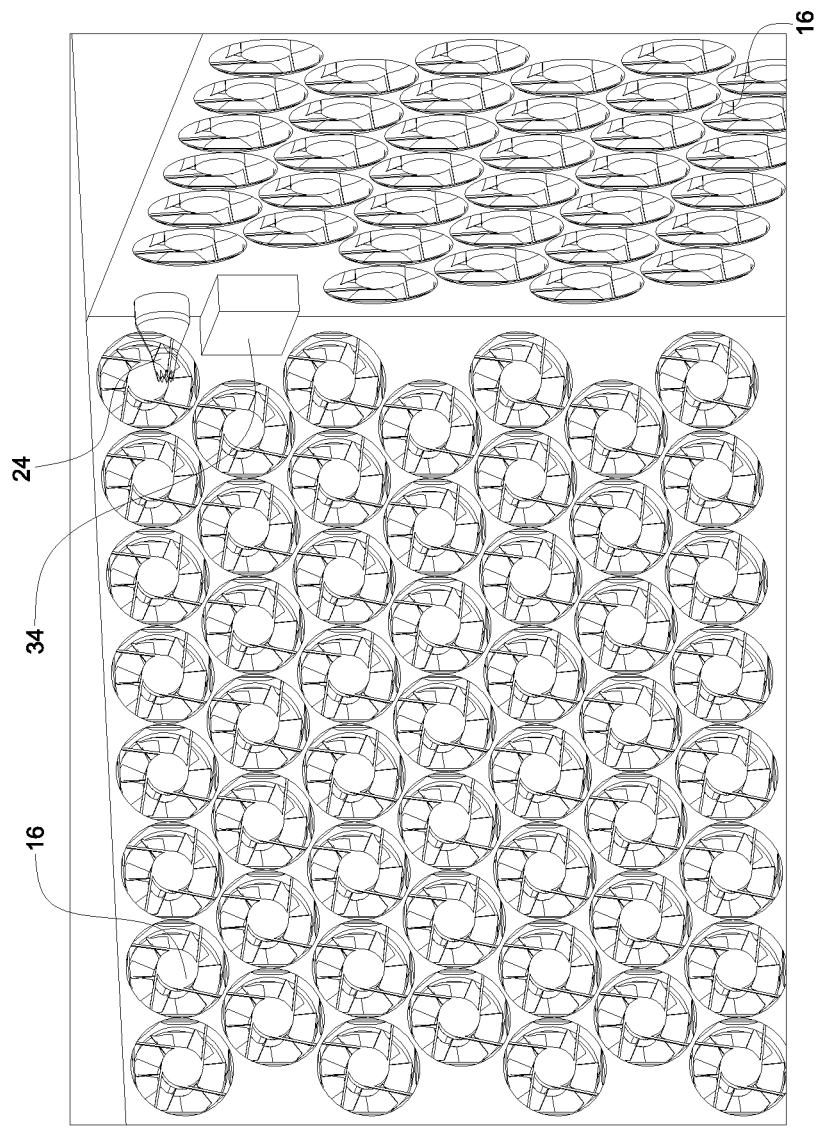
FIG. 4 illustrates a partial view of an interior of housing 12 of portable cooling device 10, in accordance with an embodiment of the present invention, wherein a nozzle 24 and a temperature sensor 34 are depicted.

Referring now to FIGS. 1-4, where the present invention is generally referred to with numeral 10, it can be observed that a portable cooling device 10, in accordance with an embodiment of the present invention, comprises a housing 12, a door 14 coupled to housing 12 for providing access to the interior of housing 12, at least one fan 16 provided in the interior of housing 12, and a cooling medium source 18 in fluid communication with housing 12.

Portable cooling device 10 comprises housing 12. Housing 12, in accordance with an embodiment of the present invention, has a cubical configuration. However, it is to be noted that the configuration of housing 12 is not limited to be cubical. Other shapes for housing 12 are well within the ambit of the present invention.

Portable cooling device 10 further comprises door 14. Door 14 is coupled to housing 12 for providing access to the interior of housing 12. In accordance with an embodiment of the present invention, door 14 can be provided on any of the edges of housing 12. Door 14 can also be provided at an operative top end of housing 12 to open in an upwardly manner. Additionally, door 14 may include a door handle 15 mounted thereon. Door handle 15 may be mounted anywhere on door 14. Door handle 15 assists a user in being able to open door 14 to be able to reach the interior of housing 12 to be able to obtain edibles items or beverages stored therein.

In accordance with an embodiment of the present invention, at least one fan 16 is provided on each surface of the interior of housing 12. In the present embodiment, at least one fan 16 are miniature fans. At least one fan 16 facilitates a uniform distribution of the cooling medium in the interior of housing 12 and to maximize the contact of the cooling medium with the edible item or beverages placed in the interior of housing 12, thereby facilitating instant cooling of the edible item or beverages.

Portable cooling device 10 further comprises a cooling medium source 18 in fluid communication with housing 12. Cooling medium source 18 is configured to release a cooling medium into the interior of housing 12 for cooling an edible item or beverage placed in the interior of housing 12. In one embodiment, cooling medium source 18 is a pressurized container of at least one of liquid nitrogen or Freon.

Portable cooling device 10 further comprising at least one conduit 20 for facilitating fluid communication between cooling medium source 18 and the interior of housing 12. In accordance with an embodiment of present invention, portable cooling device 10 has at least one conduit 20 that extends from cooling medium source 18 and terminates onto a connector 22 configured on housing 12.

Portable cooling device 10 further comprises at least one nozzle 24 configured in the interior of housing 12. At least one nozzle 24 is connected to conduit 20 present or extending within interior of housing 12 from cooling medium source 18. Nozzle 24 facilitates the discharge of the cooling medium from cooling medium source 18 inside housing 12.

Portable cooling device 10 further comprises a plurality of support members 22 configured within housing 12 for supporting thereon edible items that require instant cooling.

Portable cooling device 10 further comprises a control panel 26 configured on an external surface of housing 12 for controlling operation of portable cooling device 10. More specifically, control panel 26 facilitates operation of portable cooling device 10 in different operating modes, e.g., setting cooling time, control operation of fans during cooling, and so on.

Portable cooling device 10 further comprises a solar panel 28 configured on an external surface of housing 12. Portable cooling device 10 is designed for outdoor application. As such, solar panel 28 can facilitate operation of portable cooling device 10 during outings such as picnics or during a gathering in a backyard. In accordance with one embodiment, portable cooling device 10 also includes a battery to power up portable cooling device 10 in absence of sunlight. Although portable cooling device 10 is designed for outdoor application, its application is not limited to the outdoors. One can use portable cooling device 10 at indoor locations as well.

Portable cooling device 10 further comprises a plurality of wheels 30 for providing mobility to portable cooling device 10. In accordance with an embodiment of the present invention, plurality of wheels 30 can be castor wheels.

Portable cooling device 10 further comprises at least one proximity sensor 32 configured at an interface of door 14 and housing 12. Portable cooling device 10 further comprises a temperature sensor 34 configured in the interior of housing 12.

Portable cooling device 10 further includes a detachable power cable 36 that facilitates provision of power or power supply to portable cooling device 10 directly from a main power source or outlet, in the case that there is insufficient power gathered through solar panel 28. In an alternate embodiment the power cable or cord may instead be permanently affixed to the present invention.

Portable cooling device 10 further comprises at least one carrying handle 38 provided anywhere on the exterior of housing 12 for facilitating the lifting, carrying or transportation of portable cooling device 10. Carrying handle 38 is preferably mounted on a top surface of portable cooling device 10, but other locations on the exterior of the present invention may be suitable.

The operative configuration of portable cooling device 10 is hereinafter described. Edible items or beverage required to be cooled are placed within housing 12. In accordance with a first operative configuration, a user can use control panel 26 to facilitate cooling of edible items by operating portable cooling device 10 for a pre-determined time period, e.g., ten seconds. More specifically, control panel 26 includes a timer module that facilitates a timed operation of portable cooling device 10. During such an operation, control panel 26 is adapted to regulate entry of cooling medium in housing 12 from cooling medium source 18. After cooling medium is released within housing 12, control panel 26 facilitates operation of at least one fan 16. As mentioned previously, at least one fans 16 maximize contact of cooling medium with edible item or beverages. In one embodiment, cooling medium is liquid nitrogen which when in contact with the edible items or beverages instantly cools them. After the set time period, control panel 26 stops the operation of at least one fan 16 and discharges of cooling medium inside housing 12.

In accordance with a second operative configuration, a user can use control panel 26 to set a particular temperature to which user wants the edible item to be cooled. Temperature sensor 34 senses a temperature of the edible item or beverages and control panel 26 facilitates discharge of cooling medium inside housing 12. Once temperature sensor 34 senses that required temperature of edible item or beverage has been achieved, a feedback is sent to control panel 26 which then restricts discharge of cooling medium in housing 12 and stops the operation at least one fan 16.

Proximity sensors 32 sense whether door 14 is open or closed. If door 14 is left open and a user tries to operate portable cooling device 10, a feedback is given by proximity sensor 32 to the control panel 26, and the control panel 26 shall then display an indication to the user regarding door 14 being open.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a portable cooling device comprising:
    a. a housing having a cuboid shape including a plurality of walls and a front opening, an outer edge of at least one wall of the plurality of walls is rounded, an exterior portion a top wall of said plurality of walls includes a couple of carrying handles for facilitating the lifting, carrying or transportation of the housing;
    b. a door coupled to said housing for providing access to an interior of said housing, said door including a door handle adapted to permit a user to open or close said door, said door having a rectangular shape including rounded edges with same radius than the rounded edges of the housing;
    c. a cooling medium source being a pressurized container of at least one of liquid nitrogen or freon, said pressurized container having a cuboid shape, said pressurized container being located on an outer surface of one wall of the plurality of walls, said cooling medium source is in fluid communication with said housing, said cooling medium source configured to release a cooling medium in said interior of said housing for cooling an edible item or beverage placed in said interior of said housing;

d. a plurality of fans disposed on an interior surface of each wall of the plurality of walls of said housing and on the interior side of the door, at least one wall of the plurality of walls is entirely covered by the plurality of fans, each fan of said plurality of fans are miniature fans, the plurality of fans facilitate a uniform distribution of the cooling medium to an interior of said housing;

e. a solar panel to provide electrical power to the plurality of fans, said solar panel is located on said top wall of said housing between said couple of carrying handles;

f. at least one nozzle connected to a conduit, said conduit facilitates fluid communication between said cooling medium source and the interior of said housing, said nozzle is located on the interior of said housing, said nozzle having a first portion being cylindrical and a second portion having a conical shape;

g. a control panel located on an the outer surface of the one wall of the plurality of walls, said control panel includes settings for the temperature of the portable cooling device; and h. proximity sensors to detect if the door is opened, said control panel displays a message to inform a user that the door is opened.

2. The system according to claim 1, wherein said housing and said door are insulated.

3. The system according to claim 1, further comprising a plurality of wheels, thereby providing mobility to said portable cooling device.

4. The system according to claim 1, further comprising a power cable mounted to the housing adapted to supply power to said portable cooling device.

5. A system for a portable cooling device consisting of:
a. a housing having a cuboid shape including a left wall, a right wall, a top wall, a bottom wall, a rear wall and a front opening, an outer edge between said right wall and said top wall is a rounded edge, an outer edge between said right wall and said bottom wall is a rounded edge, an outer edge between said left wall and said top wall is a rounded edge, an outer edge between said left wall and said bottom wall is a rounded edge, an exterior portion of said top wall including a couple of carrying handles for facilitating the lifting, carrying or transportation of the housing;

b. a door hingedly coupled to said housing for providing access to an interior of said housing, said door including a door handle adapted to permit a user to open or close said door, said door having a rectangular shape including rounded edges with same radius than the rounded edges of the housing;

c. a cooling medium source being a pressurized container of at least one of liquid nitrogen or freon, said pressurized container having a cuboid shape, said pressurized container being located on an outer surface of the right wall, said cooling medium source is in fluid communication with said housing, said cooling medium source configured to release a cooling medium in said interior of said housing for cooling an edible item or beverage placed in said interior of said housing;

d. a plurality of fans disposed on an interior surface of each wall of the plurality of walls of said housing and on the interior side of the door, at least one wall of the plurality of walls is entirely covered by the plurality of fans, each fan of said plurality of fans are miniature fans, the plurality of fans facilitate a uniform distribution of the cooling medium to an interior of said housing;

e. a solar panel to provide electrical power to the plurality of fans, said solar panel is located on said top wall of said housing between said couple of carrying handles;

f. at least one nozzle connected to a conduit, said conduit facilitates fluid communication between said cooling medium source and the interior of said housing, said nozzle is located on the interior of said housing, said nozzle having a first portion being cylindrical and a second portion having a conical shape;

g. a control panel located on an the outer surface of the one wall of the plurality of walls, said control panel includes settings for the temperature of the portable cooling device;

h. proximity sensors to detect if the door is opened, said control panel displays a message to inform a user that the door is opened;

i. a temperature sensor located on the interior of said housing, said temperature sensor is connected in feedback configuration with the panel control to set a desired temperature for the edible item or beverage placed in the interior of said housing;

j. a power cable mounted to the housing adapted to supply power to said portable cooling device;

k. a plurality of wheels located on an outer portion of the bottom wall, thereby providing mobility to said portable cooling device.

* * * * *